Patented Feb. 15, 1949

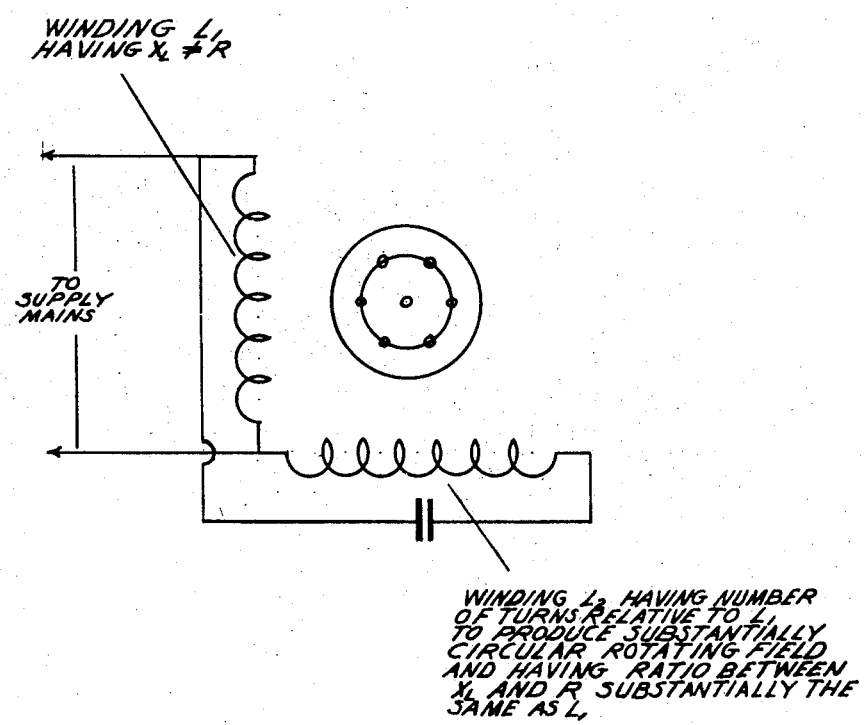

2,461,717

UNITED STATES PATENT OFFICE 2,461,717

CONDENSER MOTOR

Willem Frederik Boelsums, Eindhoven, Netherlands, assignor, by mesne assignments, to Hartford National Bank and Trust Company, Hartford, Conn., as trustee Application May 13, 1946, Serial No. 669,225
In the Netherlands July 21, 1941

Section 1, Public Law 690, August 8, 1946
Patent expires July 21, 1961

5 Claims. (Cl. 318—220)

The invention relates to condenser motors comprising two coils of substantially equal volume. As is well-known, in such a motor the one coil is connected directly to the mains alternating voltage, whereas the other coil is connected thereto in series with a suitably dimensioned condenser. If, as is the case more particularly with motors of small dimensions, for example, motors which must be liable to be easily handled in one hand, the dimensions of the motor are tied down to determined limits and if in this case a maximum torque is desirable, it will in general be found in designing the motor that the reactance and the ohmic resistance of the coil in the condenserless branch are not equal to one another.

Since for obtaining a symmetrical rotating field it is necessary that the ampere-turns should be substantially equal and should be out of phase by about 90° and since furthermore from a technical point of view it is very attractive to make the coils in the two branches exactly identical, that is to say to give them an equal number of turns, the same wire diameter, the same current load, etc., it is necessary for this purpose to make the above-mentioned reactance and ohmic resistance equal to one another, for in this case the following condition must be fulfilled:

$$r + jx_L = j\{r + j(x_L - X_C)\}$$

wherein the first member of the equation applies to the condenserless branch and the second member to the condenser branch.

It follows therefrom that:

(1) $$jx_L = jr$$

or $$x_L = r$$

and (2) $$r = -x_L + x_C$$

or since $$r = x_L$$
$$2x_L = x_C$$

or $$x_L = \tfrac{1}{2} x_C$$

Due to the fact that $x_L$ must be made equal to $r$ (see 1) the cross-sectional area of the iron core and the amount of copper of the coil, which have been calculated beforehand, with a given volume, for obtaining a maximum torque, must be essentially altered, due to which, however, the optimum dimensions of the design which correspond to the desired maximum torque, should also be altered. This has hitherto always been done in practice and an essential portion was sacrificed either to the optimum dimensions or to the torque or again to both.

The invention, on the contrary, is based on the view that it is not necessary essentially to alter either the said optimum dimensions or the desired torque or the principal dimensions of the coils, which are also connected with the optimum dimensions of the motor, so that also in practice the above-mentioned most ideal theoretical considerations can be satisfied or at least substantially satisfied.

According to the invention, with a condenser motor comprising two coils of substantially the same volume the reactance and the ohmic resistance of the coil in the condenserless branch, which are determined by the maximum torque which corresponds to given dimensions of the motor, are different whilst furthermore an electrical magnitude, more particularly the number of turns, of the coil in the condenser branch is chosen with respect to that in the condenserless branch of such different value, while retaining an at least substantially circular rotating field, that the ratio between the above-mentioned pre-determined reactance and ohmic resistance is also maintained or at least substantially maintained.

Since it is premised that an at least substantially circular rotating field must be retained it follows therefrom that also the number of ampere-turns of both coils are equal or at least substantially equal and that the two vectors of the rotating field enclose an angle of about 90°.

From the first-mentioned conclusion it follows, also in connection with the fact that the two coils have substantially the same volume, that if the number of turns is taken as the variable magnitude also the currents in the two coils and the wire diameters of the latter are mutually different, that is to say depend on the difference in the manner of turns.

Finally it may be mentioned that the invention is not restricted to the use of only two coils but also applies for the case wherein each of the coils is subdivided into smaller coils connected, for example, in series or in parallel, which coils are mounted, for example, on one or more pairs of poles. The measure according to the invention makes it possible to utilize a condenser motor, owing to its small dimensions, more particularly for driving dry-shaving apparatus or the like.

The motor should preferably be so designed that the reactance of the coil in the condenserless branch exceeds the ohmic resistance thereof so that the number of turns of the coil in the condenser branch can be taken larger than that in the condenserless branch, which permits the use of a smaller condenser.

According to a further feature of the invention, the number of turns of the coil in the condenser branch is taken at least approximately as many times larger or smaller than that in the condenserless branch as is the ratio between the reactance and the ohmic resistance of the coil in the condenserless branch. This will be explained more fully in the following description.

By the invention it may be achieved that the condenser is smaller than the value of the fraction $$\frac{1}{2\omega x_L}$$

wherein $\omega$ is equal to $2\pi$ times the frequency of the supply voltage and $x_L$ represents the reactance of the coil in the condenserless branch. This means in practice that the condenser can be given smaller dimensions than has hitherto been possible with the use of two exactly identical coils. In this respect it should be observed, however, that in this case the reactance of the condenserless branch must be larger than the ohmic resistance thereof and that the number of turns of the coil in the condenser branch must be larger than that in the condenserless branch.

For the better elucidation of the invention of the latter will be explained in detail with reference to the single figure of the accompanying drawing and to the following considerations and calculations.

In designing a condensor motor of given principal dimensions we find, as has been mentioned in the preamble to the specification determined dimensions and electrical values for the components such as coils, rotor, etc. at which the torque has a maximum value. In this way we also find the optimum values for the reactance and the resistance of the coils. This reactance and resistance, hereinafter called $x_L$ and $r$ respectively, are in general different from one another and, in accordance with the invention, they are maintained as the electrical values of the coil in the condenserless branch. On the basis of the calculation given in the preamble, from which ensues that with exactly identical coils $x_L$ should be chosen so as to be equal to $r$ it follows from the above-mentioned measure according to the invention inversely that the coil in the condenser branch cannot be identical to that in the condenserless branch. By taking the measure according to the invention, for example, by taking the number of turns of the coil in the condenser branch $n$-times as large as the number of turns of the coil in the condenserless branch it is possible to satisfy the optimum conditions and this in the following manner.

For the coil in the condenserless branch applies that $$tg\varphi = \frac{x_L}{r}$$

if $\varphi$, $x_L$ and $r$ represent the angle of the lag, the pre-determined reactance and the pre-determined resistance of this coil respectively. According to the invention $tg\varphi$ is in this case consequently not equal to unity.

The resistance and the reactance of the coil in the condenserless branch, whose number of turns is $n$-times as large, become, due to the $n$-fold increase of the length and the corresponding decrease of the cross-sectional area of the wire, equal to $n_2r$ and $n_2x_L$ respectively since the self-induction is proportional to the square of the number of turns.

Assuming that the angle of lead of the current in the condenser branch is $\psi$, we obtain $$tg\psi = \frac{x_c - n^2 x_L}{n^2 r}$$

wherein $x_c$ represents the reactance of the condenser.

For a circular rotating field the angle between the currents in the two branches must amount to 90° so that consequently $$\varphi + \psi = 90° \text{ or } tg(\varphi + \psi) = \infty$$

$$tg(\varphi + \psi) = \frac{tg\varphi + tg\psi}{1 - tg\varphi tg\psi} = \infty$$

Since $tg\varphi$ and $tg\psi$ have finite values it is necessary, in order to satisfy the last-mentioned formulae, that $1 - tg\varphi \, tg\psi$ should be equal to 0 from which it follows that $$1 - \frac{x_L}{r} \cdot \frac{(x_c - n^2 x_L)}{n^2 r} = 0$$

or that $$x_c - n^2 x_L = \frac{n^2 r^2}{x_L} \quad (1)$$

In this formula $x_c$ and $n$ are the unknowns.

In order to obtain the same current load per sq. mm. of the cross-sectional area, the impedance of the condenser branch must be $n$-times as large as that of the condenserless branch from which it follows that $$n\sqrt{x_L^2 + r^2} = \sqrt{(n^2 x_L - x_c)^2 + n^4 r^2} \quad (2)$$

Also in this equation $x_c$ and $n$ are the unknowns which may now be resolved from the two formulas (1) and (2).

We find in this case that $$n = tg\varphi = \frac{x_L}{r}$$

whilst for the value of the condenser we find $$C = \frac{\cos^2 \varphi}{\omega x_L}$$

If these formulas are exactly satisfied, which is possible, we obtain an exactly circular rotating field.

It may occur, however, that $tg\varphi$ and therefore $n$ are so large that the wire diameter determined thereby becomes too small out of considerations of manufacture. In this case the wire diameter may be slightly increased with the result that instead of an exactly circular rotating field a slightly elliptical rotating field is obtained. In this case the influence exerted on the torque is, however, slight and may be maintained at least within allowable limits.

From the above-mentioned formula $$C = \frac{\cos^2 \varphi}{\omega x_L} = \frac{2 \cos^2 \varphi}{2\omega x_L} \quad (3)$$

it may be deduced that if $tg\varphi$ is larger than unity, the condenser is always smaller than is normally the case with two exactly identical coils.

From the above it has already been deduced that in the normal case $$x_L = \tfrac{1}{2} x_c$$

from which it follows that $$\omega L = \frac{1}{2\omega C}$$

or $$C = \frac{1}{2\omega^2 L} = \frac{1}{2\omega x_L} \quad (4)$$

since $\omega L = x_L$.

If, in accordance with the invention, $tg\varphi$ is larger than unity, that is to say if $\varphi$ exceeds 45°, then $\cos \varphi$ is smaller than $\frac{1}{2}\sqrt{2}$ or $\cos^2 \varphi$ is smaller than $\frac{1}{2}$ and $2\cos^2 \varphi$ is smaller than unity.

From (3) it consequently follows that C also becomes smaller than in the formula (4) since both have the same denominator.

What I claim is:

1. A condenser motor, comprising a field winding having a condenserless branch and a condenser branch, said condenserless branch comprising a first wound coil having a given number of turns and having a reactive impedance value different from the ohmic impedance value thereof, said impedance values being in a given ratio, said condenser branch comprising a second wound coil having a number of turns different from said first coil and producing with said first coil a substantially circular rotating field, said second coil having reactive and ohmic impedance values in the same ratio as the said given ratio.

2. A condenser motor, comprising a field winding having a condenserless branch and a condenser branch, said condenserless branch comprising a first wound coil having a given number of turns and having a reactive impedance value greater than the ohmic impedance value thereof, said impedance values being in a given ratio, and said condenser branch comprising a second wound coil having a number of turns greater than the said first coil and producing with said first coil a substantially circular rotating field, said second coil having reactive and ohmic impedance values in substantially the same ratio as the said given ratio.

3. A condenser motor, comprising a field winding having a condenserless branch and a condenser branch, said condenserless branch comprising a first wound coil having a given number of turns and having a reactive impedance value different from the said ohmic impedance value thereof, said impedance values being in a given ratio, and said condenser branch comprising a second wound coil having a number of turns being at least as many times larger or smaller than the number of turns in the condenserless branch as the said given ratio and producing with said first coil a substantially circular rotating field, said second coil having reactive and ohmic impedance values in substantially the same ratio as said given ratio.

4. A condenser motor, comprising a field winding having a condenserless branch and a condenser branch, said condenserless branch comprising a first wound coil having a given number of turns and having a reactive impedance value different from the said ohmic impedance value thereof, said impedance values being in a given ratio and said condenser branch comprising a second wound coil having a number of turns different from said first coil and producing with said first coil a substantially circular rotating field, the capacity of the condenser in the said condenser branch being smaller than the value of the fraction $$\frac{1}{2\omega x_L}$$

wherein $\omega$ is equal to $2\pi$ times the frequency of the supply voltage and $x_L$ represents the reactance of the coil in the said condenserless branch.

5. A condenser motor, comprising a field winding having a condenserless branch and a condenser branch, said condenserless branch comprising a first wound coil having a given number of turns and having a reactive impedance value different from the ohmic impedance value thereof, said impedance values being in a given ratio, and said condenser branch comprising a second wound coil having a number of turns different from said first coil and producing with said first coil a substantially circular rotating field, said second coil having reactive and ohmic impedance values in substantially the same ratio as the said given ratio, the capacity of the condenser in the said condenser branch being equal or at least substantially equal to the value $$\frac{\cos^2 \varphi}{\omega x_L}$$

wherein $\varphi$ represents the angle between the current in the condenserless portion and the terminal voltage of the motor.

WILLEM FREDERIK BOELSUMS.

REFERENCES CITED

The following references are of record in the file of this patent:

UNITED STATES PATENTS

| Number | Name | Date |
|---|---|---|
| 1,894,455 | Youhouse | Jan. 17, 1933 |